United States Patent
Brunelet et al.

(10) Patent No.: US 7,834,074 B2
(45) Date of Patent: Nov. 16, 2010

(54) PLASTICIZING SYSTEM FOR RUBBER COMPOSITION

(75) Inventors: Thierry Brunelet, Clermont-Ferrand (FR); Martine Dinh, Volvic (FR); Jean-Michel Favrot, Cournon d'Auvergne (FR); Philippe Labrunie, Durtol (FR); Garance Lopitaux, Bellenaves (FR); Jean-Gabriel Royet, Romagnat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 776 days.

(21) Appl. No.: 10/589,104

(22) PCT Filed: Feb. 10, 2005

(86) PCT No.: PCT/EP2005/001338

§ 371 (c)(1),
(2), (4) Date: Jul. 26, 2007

(87) PCT Pub. No.: WO2005/087859

PCT Pub. Date: Sep. 22, 2005

(65) Prior Publication Data
US 2008/0156404 A1 Jul. 3, 2008

(30) Foreign Application Priority Data
Feb. 11, 2004 (FR) .................. 04 01365

(51) Int. Cl.
C08K 5/10 (2006.01)
E01C 7/26 (2006.01)
(52) U.S. Cl. ....................... 524/318; 524/68
(58) Field of Classification Search ........... 524/318
See application file for complete search history.

(56) References Cited

U.S. PATENT DOCUMENTS 6,300,449 B2 * 10/2001 Wideman et al. ........... 526/283

FOREIGN PATENT DOCUMENTS

EP 1270657 A1 * 1/2003

OTHER PUBLICATIONS

Translation of EP 1270657, Jan. 2003.*
V. Null, "Safe process oils for tires with low environmental impact", Kautschuk and Gummi—Kunststoffe—Asbest, Dr. Alfred Verlag GmbH, Heidelberg, Germany, vol. 52, No. 12, pp. 799-800, 802.
J. Bowman, et al., "The influence of non-toxic extender oil on SBR performances", Kautschuk Gummi Kunststoffe, vol. 57, No. 1, pp. 31-36, Feb. 1, 2004.

* cited by examiner

*Primary Examiner*—Ling-Siu Choi
*Assistant Examiner*—Hui Chin
(74) *Attorney, Agent, or Firm*—Cohen Pontani Lieberman & Pavane LLP

(57) ABSTRACT

Plasticizing system usable for the plasticizing of a diene rubber composition. The plasticizing system is based on an MES or TDAE oil and a polylimonene resin. The rubber composition has an improved resistance to abrasion and to cuts, said composition being based on at least a diene elastomer, a reinforcing filler, a cross-linking system and a plasticizing system comprising between 5 and 35 phr of an MES or TDAE oil, and between 5 and 35 phr of a polylimonene resin (phr=parts by weight per hundred of elastomer). Advantageously, this plasticizing system furthermore comprises an unsaturated ($C_{12}$-$C_{22}$) fatty acid triester of glycerol, preferably a glycerol trioleate. A process is disclosed for preparing such a composition. The composition can be used for the manufacture of a finished article or a semi-finished product intended for a suspension system of a motor vehicle, in particular a tire or a tread of such a tire.

53 Claims, No Drawings

PLASTICIZING SYSTEM FOR RUBBER COMPOSITION

RELATED APPLICATION

This is a U.S. National Phase Application under 35 USC 371 of International Application PCT/EP2004/001338, filed on Feb. 10, 2005.

FIELD OF THE INVENTION

The present invention relates to rubber compositions intended in particular for the manufacture of tires or of semi-finished products for tires, and relates more particularly to plasticizing systems usable for the plasticizing of such compositions.

BACKGROUND OF THE INVENTION

Rubber compositions for tires comprise in known manner plasticizing agents used for the preparation or synthesis of certain diane elastomers, in order to improve the processability of said compositions in the uncured state and also some of their use properties in the cured state such as, for example, in the case of tire treads, their grip on wet ground or alternatively their resistance to abrasion and to cuts.

For a very long time, it has essentially been highly aromatic oils derived from petroleum, known by the name of DAE oils (for "Distillate Aromatic Extracts"), which have been used to fulfill this plasticizing-agent function. A number of tire manufacturers, for environmental reasons, are today considering gradually replacing these DAE oils by substitution oils of the "non-aromatic" type, in particular by what are called MES oils (for "Medium Extracted Solvates") or TDAE oils ("Treated Distillate Aromatic Extracts"), which are characterized by a very low content of polyaromatics (approximately 20 to 50 times less).

The Applicants have noted that the replacement, in tire rubber compositions, of the aromatic DAE oils by these MES or TDAE oils was unexpectedly expressed in a reduction in the resistance to abrasion and to cuts of said compositions, this reduction possibly even being crippling for certain applications, in particular with respect to the problem of chipping of tire treads.

"Chipping" (or "scaling") is a known damage mechanism which corresponds to surface lamellar tears—in the form of chips—of the "rubber" (or rubber composition) which constitutes the treads, under certain aggressive travelling conditions. This problem is encountered in particular on tires for off-road vehicles or vehicles of the site or construction type, which have to travel over different types of ground, some of which are stony and relatively aggressive; it has for example been described, as have some solutions for overcoming it, in patent specifications EP-A-0 030 579 and FR-A-2 080 661 (or GB-A-1 343 487).

Continuing their research, the Applicants have discovered that replacing a portion of these MES or TDAE oils with another specific plasticizing agent not only made it possible to solve the above problem, but, what is even more surprising, also to improve still further the resistance to abrasion and to cuts of the rubber compositions using conventional aromatic oils as plasticizing agents.

SUMMARY OF THE INVENTION

One aspect of the invention relates to a rubber composition based on at least a diene elastomer, a reinforcing filler, a plasticizing system and a cross-linking system, wherein said plasticizing system comprises (phr=parts by weight per hundred parts of elastomer):

between 5 and 35 phr of an MES or TDAE oil;
between 5 and 35 phr of a polylimonene resin.

Another aspect of the invention is directed to a process for preparing a rubber composition having an improved resistance to abrasion and to cuts, this composition based on a diene elastomer, a reinforcing filler, a plasticizing system and a cross-linking system. The process comprises the following steps:

incorporating in a diene elastomer, during a first step referred to as "non-productive", at least a reinforcing filler and a plasticizing system, by thermomechanically kneading the entire mixture, in one or more stages, until a maximum temperature of between 110° C. and 190° C. is reached;

cooling the entire mixture to a temperature of less than 100° C.;

then incorporating, during a second step referred to as "productive", the cross-linking system;

kneading the entire mixture until a maximum temperature of less than 110° C. is reached, wherein said plasticizing system comprises:

between 5 and 35 phr of an MES or TDAE oil;
between 5 and 35 phr of a polylimonene resin.

Another aspect of the invention is directed to a plasticizing system usable for the plasticizing of a diene rubber composition, said system comprising in combination an MES or TDAE oil and a polylimonene resin. A further aspect of the invention is directed to the use of such a system for the plasticizing of a diene rubber composition.

Another aspect of the invention is the use of a composition according to an embodiment of the invention for the manufacture of a finished article or a semi-finished product made of rubber intended for any suspension system of a motor vehicle, such as tires, internal safety supports for tires, wheels, rubber springs, elastomeric joints, or other suspension and anti-vibration elements.

Another aspect of the invention is the use of a composition according to an embodiment of the invention for the manufacture of tires or semi-finished products made of rubber intended for these tires, these semi-finished products preferably selected from the group consisting of treads, crown reinforcement plies, sidewalls, carcass reinforcement plies, beads, protectors, underlayers, rubber blocks and other internal rubbers, in particular decoupling rubbers, intended to provide the connection or the interface between the aforementioned zones of the tires.

Another aspect of the invention is the use of a composition according to an embodiment of the invention for the manufacture of a tire tread having improved resistance to cuts and to chipping.

Another aspect of the invention is also the finished articles and semi-finished products made of rubber themselves, in particular tires and semi-finished products for tires, when they comprise an elastomeric composition according to an embodiment of the invention. The tires according to an embodiment of the invention are in particular intended for passenger vehicles and for two-wheeled vehicles (motorcycles, bicycles), industrial vehicles selected from among vans, "heavy vehicles"—i.e. subway trains, buses, road transport machinery (lorries, tractors, trailers), off-road vehicles—agricultural or construction machinery, aircraft, and other transport or handling vehicles.

DETAILED DESCRIPTION OF THE PREFERRED EMBODIMENTS

I. Measurements and Tests Used

The rubber compositions according to the invention are characterized, before and after curing, as indicated below.

I-1. Mooney Plasticity

An oscillating consistometer such as described in French Standard NF T 43-005 (1991) is used. The Mooney plasticity is measured in accordance with the following principle: the raw composition (i.e. before curing) is moulded in a cylindrical enclosure heated to 100° C. After one minute's preheating, the rotor turns within the test piece at 2 rpm, and the torque used for maintaining this movement is measured after 4 minutes' rotation. The Mooney plasticity (ML 1+4) is expressed in "Mooney units" (MU, with 1 MU=0.83 N·m).

I-2. Scorching Time

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

I-3. Shore A Hardness

The Shore A hardness of the compositions after curing is assessed in accordance with ASTM Standard D 2240-86.

I-4. Resistance to Cuts and to Chipping

The resistance to cuts and to chipping of the rubber compositions is evaluated by means of a running test on tires whose treads are formed of said compositions.

The test is carried out at a moderate travelling speed (less than 60 km/h), on two successive circuits:
- a first run on a circuit of stony hard-packed ground (large-size stones), intended to make the tread more fragile, in the form of cuts and other surface attacks on the blocks of rubber forming its tread pattern;
- a second run on a highly bending tarred circuit, intended to "reveal" the chipping, following the tearing-off of pieces of rubber (in the form of chips), along the planes which have been rendered more fragile.

At the end of the running test, the state of the treads is evaluated firstly visually (photographs) by assigning a mark (on a scale of severity of 1 to 10), and secondly by measuring the weight loss. The resistance to chipping is finally assessed by a relative overall mark (base 100 on a reference product).

II. Conditions of Implementation of the Invention

The rubber composition according to the invention, usable in particular for manufacturing a tire or a tire tread, is based on at least a diene elastomer, a reinforcing filler, a cross-linking system and a specific plasticizing system.

The expression composition "based on" is to be understood to mean a composition comprising the mixture and/or the reaction product of the various constituents, some of these base constituents being liable to, or intended to, react together, at least in part, during the different phases of manufacture of the composition, in particular during the cross-linking or vulcanization thereof.

In the present description, unless expressly indicated otherwise, all the percentages (%) indicated are mass percentages.

II-1. Diene Elastomer

"Diene" elastomer or rubber must be understood in known manner to mean a (one or more is understood) elastomer resulting at least in part (i.e. a homopolymer or a copolymer) from diene monomers (monomers bearing two double carbon-carbon bonds, whether conjugated or not).

These diene elastomers may be classed in two categories: "essentially unsaturated" or "essentially saturated". Generally "essentially unsaturated" is understood to mean a diene elastomer resulting at least in part from conjugated diene monomers, having a content of members or units of diene origin (conjugated dienes) which is greater than 15% (mole percent); thus diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a) any homopolymer obtained by polymerisation of a conjugated diene monomer having 4 to 12 carbon atoms;

(b) any copolymer obtained by copolymerisation of one or more dienes conjugated together or with one or more vinyl-aromatic compounds having 8 to 20 carbon atoms;

(c) a ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d) a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention is preferably used with essentially unsaturated diene elastomers, in particular those of type (a) or (b) above.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert, butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomising agent and the quantities of modifying and/or randomising agent used. The elastomers may for example be block, random, sequential or microsequential elastomers, and may be prepared in dispersion or in solution; they may be coupled and/or starred or alternatively functionalised with a coupling and/or starring or functionalising agent.

Polybutadienes are suitable, and in particular those having a content of 1,2-units of between 4% and 80%, or those having a cis-1,4 content of more than 80%, polyisoprenes, butadiene/styrene copolymers and in particular those having a styrene content of between 5% and 50% by weight and more particularly between 20% and 40%, a content of 1,2-bonds of the butadiene fraction of between 4% and 65%, a content of trans-1,4 bonds of between 20% and 80%, butadiene/isoprene copolymers and in particular those having an isoprene content of between 5% and 90% by weight and a glass transition temperature (Tg, measured in accordance with ASTM D3418) of −40° C. to −80° C., isoprene/styrene copolymers and in particular those having a styrene content of between 5% and 50% by weight and a Tg of between −25° C. and −50° C. In the case of butadiene/styrene/isoprene copolymers, those which are suitable are in particular those having a styrene content of between 5% and 50% by weight and more particularly between 10% and 40%, an isoprene content of between 15% and 60% by weight, and more particularly between 20% and 50%, a butadiene content of between 5% and 50% by weight and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

In summary, the diene elastomer of the composition according to the invention is preferably selected from the group of highly unsaturated diene elastomers which consists of polybutadienes (abbreviated to "BR"), polyisoprenes (IR), natural rubber (NR), butadiene copolymers, isoprene copolymers and mixtures of these elastomers. Such copolymers are more preferably selected from among the group consisting of butadiene/styrene copolymers (SBR), isoprene/butadiene copolymers (BIR), isoprene/styrene copolymers (SIR) and isoprene/butadiene/styrene copolymers (SBIR).

According to one particular embodiment, the diene elastomer is majoritarily (that is to say to more than 50 phr) an SBR, be it an SBR prepared in emulsion ("E-SBR") or an SBR prepared in solution ("S-SBR"), or an SBR/BR, SBR/NR (or SBR/IR), or alternatively BR/NR (or BR/IR) blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used; such an SBR may advantageously be used in a mixture with a BR having preferably more than 90% cis-1,4 bonds.

According to another particular embodiment, the diene elastomer is majoritarily (to more than 50 phr) an isoprene elastomer. This is the case in particular when the compositions of the invention are intended to constitute, in tires, the rubber matrices of certain treads (for example for industrial vehicles), of crown reinforcement plies (for example of working plies, protective plies or wrapping plies), carcass reinforcement plies, sidewalls, beads, protectors, underlayers, blocks of rubber and other internal rubbers providing the interface between the aforementioned zones of the tires.

"Isoprene elastomer" is understood to mean, in known manner, an isoprene homopolymer or copolymer, in other words a diene elastomer selected from among the group consisting of natural rubber (NR), synthetic polyisoprenes (IR), the various isoprene copolymers and mixtures of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used.

According to another particular embodiment, in particular when it is intended for a tire sidewall, or for an airtight internal rubber of a tubeless tire (or other element impermeable to air), the composition according to the invention may contain at least one essentially saturated diene elastomer, in particular at least one EPDM copolymer or a butyl rubber (possibly chlorinated or brominated), whether these copolymers be used alone or in a mixture with highly unsaturated diene elastomers such as mentioned previously, in particular NR or IR, BR or SBR.

According to another preferred embodiment of the invention, the rubber composition comprises a blend of a (one or more) diene elastomer referred to as "of high Tg" having a Tg of between −65° C. and −10° C. and a (one or more) diene elastomer referred to as "of low Tg" of between −110° C. and −80° C., more preferably between −105° C. and −90° C. The elastomer "of high Tg" is preferably selected from among the group consisting of S-SBRs, E-SBRs, natural rubber, synthetic polyisoprenes (having a cis-1,4 linkage content preferably greater than 95%), BIRs, SIRs, SBIRs, and mixtures of these elastomers. The elastomer "of low Tg" preferably comprises butadiene units in an amount at least equal to 70%; it preferably consists of a polybutadiene (BR) having a cis-1,4 linkage content greater than 90%.

According to a specific embodiment of the invention, the rubber composition comprises for example from 40 to 100 phr, in particular from 50 to 100 phr, of an elastomer of high Tg in a blend with 0 to 60 phr, in particular from 0 to 50 phr, of an elastomer of low Tg; according to another embodiment, it comprises for example 100 phr of one or more copolymers of styrene and butadiene prepared in solution.

According to another specific embodiment, the rubber composition comprises at least, as high-Tg elastomer, an S-SBR having a Tg of between −50° C. and −15° C. or at least an E-SBR having a Tg of between 65° C. and −30° C.

According to another specific embodiment of the invention, the diene elastomer of the composition according to the invention comprises a blend of a BR (as low-Tg elastomer) having a cis-1,4 linkage content of greater than 90%, with an S-SBR or an E-SBR (as high-Tg elastomer).

The compositions of the invention may contain a single diene elastomer or a mixture of several diene elastomers, the diene elastomer(s) possibly being used in association with any type of synthetic elastomer other than a diene elastomer, or even with polymers other than elastomers, for example thermoplastic polymers.

II-2. Reinforcing Filler

Any type of reinforcing filler known for its ability to reinforce a rubber composition usable for the manufacture of tires may be used, for example an organic filler such as carbon black or alternatively a reinforcing inorganic filler such as silica, with which a coupling agent is associated.

Suitable carbon blacks are all the carbon blacks, particularly blacks of the type HAF, ISAF and SAF, conventionally used in tires (what are called tire-grade blacks). Of the latter, reference will more particularly be made to the reinforcing carbon blacks of series 100, 200 or 300 (ASTM grades), such as, for example, the blacks N115, N134, N234, N326, N330, N339, N347, N375, or alternatively, depending on the intended applications, the blacks of higher series (for example N660, N683, N772).

"Reinforcing inorganic filler" is to be understood here, in known manner, to mean any inorganic or mineral filler, whatever its colour and its origin (natural or synthetic), also referred to as "white" filler, "clear" filler or alternatively "non-black" filler, in contrast to carbon black, being capable, on its own, without any other means than an intermediate coupling agent, of reinforcing a rubber composition intended for the manufacture of tires, in other words which is capable of replacing a conventional tire-grade carbon black in its reinforcement function; such a filler is generally characterized, in known manner, by the presence of hydroxyl (—OH) groups at its surface.

The physical state in which the reinforcing inorganic filler is present is immaterial, whether it be in the form of a powder, microbeads, granules, balls or any other appropriate densified form. Of course, "reinforcing inorganic filler" is also understood to mean mixtures of different reinforcing inorganic fillers, in particular of highly dispersible siliceous and/or aluminous fillers such as described hereafter.

Suitable reinforcing inorganic fillers are in particular mineral fillers of siliceous type, in particular silica ($SiO_2$), or of aluminous type, in particular alumina ($Al_2O_3$). The silica used may be any reinforcing silica known to the person skilled in the art, in particular any precipitated or fumed silica having a BET surface area and a CTAB specific surface area both of which are less than 450 $m^2/g$, preferably from 30 to 400 $m^2/g$. As highly dispersible precipitated silicas (referred to as "HD"), mention will be made of for example the silicas Ultrasil 7000 and Ultrasil 7005 from Degussa, the silicas Zeosil 1165MP, 1135MP and 1115MP from Rhodia, the silica Hi-Sil EZ150G from PPG, the silicas Zeopol 8715, 8745 and 8755 from Huber, silicas such as described in application WO 03/016387. Examples of reinforcing aluminas are the aluminas "Baikalox" "A125" or "CR125" from Baikowski, "APA-100RDX" from Condea, "Aluminoxid C" from Degussa or "AKP-G015" from Sumitomo Chemicals.

By way of other examples of inorganic filler capable of being used in the rubber compositions of the invention, mention may also be made of aluminium (oxide-)hydroxides, aluminosilicates, titanium oxides, silicon carbides or nitrides, all of the reinforcing type such as described in applications WO 99/28376, WO 00/73372, WO 02/053634, WO 2004/003067 and WO 2004/056915.

The person skilled in the art will understand that a reinforcing filler of a different nature, in particular organic, could be used as filler equivalent to the reinforcing inorganic filler above, when this reinforcing filler would be covered with an inorganic layer such as silica, or alternatively would comprise on its surface functional sites, in particular hydroxyl sites, necessitating the use of a coupling agent to establish the bond between the filler and the elastomer.

When the compositions of the invention are intended for tire treads of low rolling resistance, the reinforcing inorganic filler used, in particular if it is silica, preferably has a BET surface area of between 60 and 250 $m^2/g$, for example between 80 and 230 $m^2/g$.

Preferably, the amount of total reinforcing filler (carbon black and/or reinforcing inorganic filler) is between 20 and 200 phr, more preferably between 30 and 150 phr (parts by weight per hundred parts of elastomer), the optimum is known manner being different according to the intended specific applications: the level of reinforcement expected of a bicycle tire, for example, is of course lower than that required for a tire capable of travelling at a sustained high speed, for example a motorcycle tire, a passenger-vehicle tire or a tire for a utility vehicle such as a heavy vehicle.

For coupling the reinforcing inorganic filler to the diene elastomer, a coupling agent (or bonding agent) which is at least bifunctional which is intended to provide a sufficient chemical and/or physical connection between the inorganic filler (surface of its particles) and the diene elastomer, in particular bifunctional organosilanes or polyorganosiloxanes, is used.

In particular polysulfurised silanes, which are referred to as "symmetrical" or "asymmetrical" depending on their specific structure, are used, such as described for example in applications WO03/002648 and WO03/002649.

Particularly suitable, without the definition below being limitative, are what are called "symmetrical" polysulfurised silanes which satisfy the following general formula (I):

$$Z\text{-}A\text{-}S_n\text{-}A\text{-}Z, \text{ in which:} \qquad \qquad (I)$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

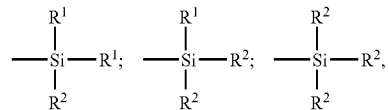

in which:

the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl), the radicals $R^2$, which may or may not be substituted, and may be identical or different, represent a hydroxyl group, a $C_1$-$C_{18}$ alkoxyl group or a $C_5$-$C_{18}$ cycloalkoxyl group (preferably a group selected from among hydroxyl, $C_1$-$C_{18}$ alkoxyls and $C_5$-$C_8$ cycloalkoxyls, more preferably still a group selected from among hydroxyl and $C_1$-$C_4$ alkoxyls, in particular hydroxyl, methoxyl and ethoxyl).

In the case of a mixture of polysulfurised alkoxysilanes of Formula (I) above, in particular conventional, commercially available, mixtures, the average value of the "n"s is a fractional number, preferably between 2 and 5, more preferably close to 4. However, the invention may also be implemented advantageously for example with disulfurised alkoxysilanes (n=2).

As examples of polysulfurised silanes, mention will be made more particularly of the polysulfides (in particular disulfides, trisulfides or tetrasulfides) of bis-(($C_1$-$C_4$)alkoxyl-($C_1$-$C_4$)alkylsilyl-($C_1$-$C_4$)alkyl), such as for example bis(3-trimethoxysilylpropyl) or bis(3-triethoxysilylpropyl)

polysulfides. Of these compounds, in particular bis(3-triethoxysilylpropyl) tetrasulfide, abbreviated TESPT, of the formula $[(C_2H_5O)_3Si(CH_2)_3S_2]_2$, or bis(triethoxysilylpropyl) disulfide, abbreviated TESPD, of the formula $[(C_2H_5O)_3Si(CH_2)_3S_2]_2$, are used. Mention will also be made as preferred examples of the polysulfides (in particular disulfides, trisulfides or tetrasulfides) of bis-(mono($C_1$-$C_4$) alkoxyl-di($C_1$-$C_4$)alkylsilylpropyl), more particularly bis-monoethoxydimethylsilylpropyl tetrasulfide or disulfide as described in patent application WO 02/083782.

As coupling agents other than polysulfurised alkoxysilane, mention will be made in particular of the bifunctional POS (polyorganosiloxanes), or alternatively the hydroxysilane polysulfides ($R^2$=OH in Formula I above) such as described in patent applications WO 02/30939 and WO 02/31041.

In the rubber compositions according to the invention, the content of coupling agent is preferably between 2 and 15 phr, more preferably between 4 and 12 phr (for example between 3 and 8 phr). However, it is generally desirable to use as little as possible thereof. Relative to the weight of reinforcing inorganic filler, the amount of coupling agent typically represents between 0.5 and 15% by weight relative to the quantity of reinforcing inorganic filler. In the case for example of tire treads for passenger vehicles, the coupling agent is used in a preferred amount of less than 12%, or even less than 10% by weight relative to this quantity of reinforcing inorganic filler.

The coupling agent could be grafted beforehand on to the diene elastomer or on to the reinforcing inorganic filler. However, it is preferred, in particular for reasons of better processing of the compositions in the uncured state, to use the coupling agent either grafted onto the reinforcing inorganic filler, or in the free (i.e. non-grafted) state.

II-3. Plasticizing System

The rubber compositions of the invention have the essential characteriztic of using a plasticizing system comprising at least:

between 5 and 35 phr of an MES or TDAE oil;

between 5 and 35 phr of a polylimonene resin.

MES and TDAE oils are well-known to the person skilled in the art: reference will be made for example to the recent publication KGK (Kautschuk Gummi Kunststoffe) 52. Jahrgang, Nr. 12/99, pp. 799-805, entitled "*Safe Process Oils for Tires with Low Environmental Impact*". Patent applications describing the use of such oils, as a substitute for conventional aromatic oils, are for example EP-A-1 179 560 (or US2002/0045697) or EP-A-1 270 657.

Polylimonene is by definition a homopolymer of limonene or 4-isopropenyl 1-methylcyclohexene. It exists in known manner in the form of three possible isomers: L-limonene (laevorotatory enantiomer), D-limonene (dextrorotatory enantiomer), or alternatively dipentene, racemate of the dextrorotatory and laevorotatory enantiomers.

Polylimonene resins (it will be recalled that the designation "resin" is reserved by definition for a solid compound) are known essentially for their application as adhesives in the food processing industry.

The amount of polylimonene resin must [be] between 5 and 35 phr. Below the minimum indicated, the technical effect desired is inadequate, whereas beyond 35 phr the adhesive strength of the compositions in the uncured state, on the mixing tools, becomes crippling from an industrial point of view. For this reason, the amount of polylimonene resin is preferably between 5 and 25 phr, more preferably between 5 and 20 phr.

That of the MES or TDAE oil is preferably of between 10 and 30 phr, more preferably of between 10 and 25 phr, whereas the amount of total plasticizing system of the invention comprising the MES and/or TDAE oil and the polylimonene resin is, according to a preferred embodiment, between 15 and 45 phr, more preferably between 20 and 40 phr.

The polylimonene resin used exhibits at least one (more preferably all) of the following preferred characteriztics:
a Tg greater than 40° C. (more particularly greater than 50° C.);
a number-average molecular weight (Mn) of between 400 and 2000 g/mol;
a polymolecularity index (Ip) of less than 2 (reminder: Ip=Mw/Mn, where Mw=weight-average molecular weight).

Even more preferably, the polylimonene resin exhibits at least one (more preferably all) of the following preferred characteriztics:
a Tg of between 50° C. and 120° C. (more particularly between 60° C. and 100° C.);
a molecular weight Mn of between 500 and 1000 g/mol;
a polymolecularity index of less than 1.8.

The glass transition temperature Tg is measured in known manner by DSC (Differential Scanning Calorimetry), in accordance with Standard ASTM D3418 (1999). The macrostructure (Mw and Mn) of the polylimonene is determined by steric exclusion chromatography at a temperature of 35° C. (solvent tetrahydrofuran at a flow rate of 1 ml/min; concentration 1 g/l ; calibration by mass of polystyrene; detector consisting of a differential refractometer).

The polylimonene resins are available commercially, for example sold:
by DRT under the name "Dercolyte L120" (Mn=625 g/mol; Mw=1010 g/mol; Ip=1.6; Tg=72° C.);
by ARIZONA under the name "Sylvagum TR7125C" (Mn=630 g/mol; Mw=950 g/mol; Ip=1.5; Tg=70° C.).

They may also be prepared by known processes, for example as follows:

0.42 g of $AlCl_3$, which is placed in a "Steinie" bottle under nitrogen, is weighed into a glove box, in an inert atmosphere. 50 ml of anhydrous toluene, then 50 ml of pure D-limonene (dextrorotatory enantiomer) is then introduced into this bottle, then the bottle is stirred in a bath thermostatically controlled to 25° C. for 4 hours. The reaction is stopped with 3 ml of acetylacetone, and the resin is recovered by coagulation in methanol after addition of 0.4 phr of phenolic antioxidant ("Etyl702"). After drying in an oven, a yellow, pale, translucent resin is obtained (average yield 67%), consisting exclusively of limonene units (Mn=585 g/mol; Mw=866 g/mol; Ip=1.5; Tg=68° C.).

According to a preferred embodiment of the invention, in particular when the composition of the invention is intended for a tire tread, the plasticizing system of the invention furthermore comprises between 5 and 35 phr (more preferably between 10 and 30 phr) of an unsaturated ($C_{12}$-$C_{22}$) fatty acid triester of glycerol, in particular a glycerol trioleate (derived from oleic acid and glycerol), present for example in the form of a vegetable sunflower oil or rapeseed oil. Such a triester makes it possible to minimise, in said tread, on one hand the exudation during travel by compression of the total plasticizing system and, on the other hand, the migration of said plasticizer towards mixes adjacent to the tread. This results in compaction and hardening which are also minimised for the tread and, consequently, in preservation over time of the grip performance. In such a case, preferably, the fatty acid (or all the fatty acids if several are present) comprises oleic acid in a mass fraction at least equal to 60%.

Furthermore it was noted that using said unsaturated ($C_{12}$-$C_{22}$) fatty acid triester of glycerol, very particularly in a preferred amount of between 10 and 20 phr, made it possible not only to improve the grip of the tread but also, unexpectedly, to increase still further its resistance to chipping. This preferred embodiment is particularly suitable, by way of example, for treads for passenger-vehicle or agricultural-vehicle tires, in particular for passenger-vehicle tires of "winter" type intended for snow-covered or icy roads.

When the plasticizing system of the invention comprises such a glycerol fatty acid triester in addition to the MES or TDAE oil and the polylimonene resin, the overall amount of plasticizing system in the rubber composition of the invention is preferably between 20 and 70 phr, more preferably between 30 and 60 phr.

II-4. Various Additives

The rubber compositions according to the invention also comprise all or some of the conventional additives usually used in elastomer compositions intended for the manufacture of tires, in particular treads, such as, for example, pigments, protective agents such as anti-ozone waxes, chemical antiozonants, antioxidants, anti-fatigue agents, reinforcing resins, methylene acceptors (for example novolac phenolic resin) or donors (for example HMT or H3M) such as described for example in application WO 02/10269, a cross-linking system based either on sulfur or on sulfur and/or peroxide and/or bismaleimide donors, vulcanization accelerators and vulcanization activators.

These compositions may also contain, in addition to the coupling agents, coupling activators, agents for covering the inorganic fillers, or more generally processing aids liable, in known manner, owing to an improvement in the dispersion of the filler in the rubber matrix and to a reduction in the viscosity of the compositions, to improve their ability to be worked in the uncured state, these agents being, for example, hydrolysable silanes such as alkylalkoxysilanes, polyols, polyethers, primary, secondary or tertiary amines, or hydroxylated or hydrolysable polyorganosiloxanes.

II-5. Preparation of the Rubber Compositions

The compositions are produced in suitable mixers, using two successive preparation phases well-known to the person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) down to a lower temperature, typically less than 110° C., for example between 40° C. and 100° C., during which finishing phase the cross-linking system is incorporated.

The process according to the invention for preparing a rubber composition having improved resistance to abrasion and to cuts comprises the following steps:

incorporating in a diene elastomer, during a first step (referred to as "non-productive"), at least one reinforcing filler and a plasticizing system, by thermomechanically kneading the entire mixture, in one or more stages, until a maximum temperature of between 110° C. and 190° C. is reached;

cooling the entire mixture to a temperature of less than 100° C.;

then incorporating, during a second step (referred to as "productive"), the cross-linking system; kneading the entire mixture until a maximum temperature of less than 110° C. is reached, and it is characterized in that said plasticizing system comprises:

between 5 and 35 phr of an MES or TDAE oil;

between 5 and 35 phr of a polylimonene resin.

By way of example, the non-productive phase is effected in a single thermomechanical step during which in a first phase all the base constituents necessary (diene elastomer, reinforcing filler and coupling agent if necessary, plasticizing system), then in a second phase, for example after one to two minutes' kneading, the other additives, any supplementary covering agents or processing agents, with the exception of the cross-linking system, are introduced into a suitable mixer, such as a conventional internal mixer. The total duration of the kneading, in this non-productive phase, is preferably between 1 and 15 minutes.

After cooling the mixture thus obtained, the cross-linking system is then incorporated in an external mixer such as an open mill, kept at low temperature (for example between 40° C. and 100° C.). The whole is then mixed (productive phase) for several minutes, for example between 2 and 15 min.

The cross-linking system is preferably a vulcanization system based on sulfur and an accelerator. Any compound capable of acting as vulcanization accelerator for the diene elastomers in the presence of sulfur may be used, in particular those selected from among the group consisting of 2-mercaptobenzothiazyl disulfide (abbreviated to "MBTS"), N-cyclohexyl-2-benzothiazyl sulfenamide (abbreviated to "CBS"), N,N-dicyclohexyl-2-benzothiazyl sulfenamide (abbreviated to "DCBS"), N-tert. butyl-2-benzothiazyl sulfenamide (abbreviated to "TBBS"), N-tert. butyl-2-benzothiazyl sulfenimide (abbreviated to "TBSI") and mixtures of these compounds. Preferably, a primary accelerator of sulfenamide type is used.

To this vulcanization system there may be added, incorporated during the first non-productive phase and/or during the productive phase, various known secondary accelerators or vulcanization activators such as zinc oxide, stearic acid, guanidine derivatives (in particular diphenylguanidine), etc.. In the case of the composition of the invention being used in a tire tread, the amount of sulfur is for example between 0.5 and 3.0 phr, and that of the primary accelerator between 0.5 and 5.0 phr.

The final composition thus obtained can then be calendered, for example in the form of a film or a sheet, or alternatively extruded, for example in order to form a rubber profiled element used for manufacturing a semi-finished product for tires, such as treads, plies or other strips, underlayers, various rubber blocks, whether or not reinforced by textile or metallic reinforcing threads, intended to form part of the structure of the tire.

The vulcanization (or curing) can then be carried out in known manner at a temperature generally of between 130° C. and 200° C., preferably under pressure, for a sufficient time which may vary for example between 5 and 90 min according to in particular the curing temperature, the vulcanization system adopted and the vulcanization kinetics of the composition in question.

The invention relates to the rubber compositions previously described, both in the "uncured" state (i.e. before curing) and in the "cured" or vulcanized state (i.e. after vulcanization).

III. Examples of Embodiment of the Invention

III-1. Preparation of the Compositions

For the following tests, the procedure is as follows: the diene elastomer (or the mixture of diene elastomers, if applicable), the plasticizing system (or the remainder thereof if part is already incorporated in the diene elastomer as extender oil), the reinforcing filler (plus a coupling agent, or even a covering agent in the case of a reinforcing inorganic filler such as silica) then, after one to two minutes' kneading, the various other ingredients with the exception of the vulcanization system are introduced into a conventional internal blade mixer of the "Banbury" type, filled to 70% and the initial tank temperature of which is approximately 60° C.

Thermomechanical working (non-productive phase) is then performed in one step (total duration of kneading equal to about 5 minutes), until a maximum "dropping" temperature of about 160° C. is reached. The mixture thus obtained is recovered, it is cooled and then the vulcanization system is added on an external mixer (homo-finisher) at 40° C., by mixing everything (productive phase) for 3 to 4 minutes on this open mill.

The compositions thus obtained are then calendered in the form of sheets (thickness of 2 to 3 mm) or of thin films of rubber in order to measure their properties, or extruded to form profiled elements which can be used directly, after cutting out and/or assembling to the dimensions desired, as tire treads.

III-2. Characterization Tests—Results

Test 1

The object of this test is to demonstrate the improved resistance to chipping of a composition according to the invention constituting a tire tread for a passenger vehicle.

This composition according to the invention (C-3) is compared with two other control compositions (C-1 and C-2), the three compositions tested being identical except for the following differences:

C-1: control according to the prior art with aromatic oil (reference);
C-2: control with MES oil only;
C-3: composition with plasticizing system according to the invention (combination of MES oil and polylimonene resin).

Tables 1 and 2 show the formulation of the different compositions (Table 1—amounts of the different products expressed in phr), and their usual properties before and after curing.

Compositions C-1 and C-2 were formulated with an equal volume of plasticizing oil, which explains a slightly smaller amount of MES oil (lesser density) for composition C-2. In the composition C-3 according to the invention, approximately ⅔ of MES oil was replaced by polylimonene resin (20 phr), compared with composition C-2.

The polylimonene resin used has all of the following preferred characteriztics:
a Tg of between 60° C. and 100° C.;
a molecular weight Mw of between 500 and 1000 g/mol;
a polymolecularity index of less than 1.8.

On reading Table 2, it will be noted that the usual properties of the compositions, before and after curing, are substantially identical: equal values of Mooney plasticity, scorching time and Shore hardness.

However, it is the test of resistance to chipping which demonstrates the full advantage of the composition according to the invention compared with the control compositions.

The compositions C-1, C-2 and C-3 were used as radial-carcass passenger-tire treads, of dimension 195/65 R15 (speed index H), manufactured conventionally and identical in all points except for the rubber composition constituting the tread. These tires are referred to as P-1, P-2 and P-3 respectively, and were mounted on a passenger vehicle in order to be subjected to the endurance test described in section 1-4 above. The specific conditions of the test are as follows: vehicle: Citroën "C5" (front and rear pressure: 2.2 bar); tires tested mounted at the front of the vehicle; ambient temperature 25° C.

The results of the test of resistance to chipping are listed in Table 3, in relative units, the base 100 having being used for the control tire P-1 the tread of which comprises the conventional aromatic oil.

It will be noted first of all that the replacement of the aromatic oil by the MES oil (tires P-2 compared with the tires P-1) results in a significant drop, which is furthermore unexpected, of 15% in the resistance to chipping, which is entirely noteworthy and may be considered as being crippling for certain uses of the tires.

On the other hand, replacement of a portion of the MES oil by the polylimonene resin results surprisingly, in a spectacular increase in performance (+40% for the tires P-3 compared with the tires P-2), the resistance observed on the tires P-3 of the invention even being greater by 15% than that of the tires P-1 constituting the starting reference.

Test 2

Test 1 above was reproduced by replacing the HD silica with carbon black as reinforcing filler.

The corresponding compositions, referred to as C-4, C-5 and C-6, were used as tire treads (P-4, P-5 and P-6 respectively) identical to the previous ones, and subjected to the same running test.

Tables 4 and 5 show the formulation of the different compositions (Table 5—amounts of the different products expressed in phr), and their properties before and after curing. In the sole composition C-6 according to the invention, approximately ⅓ of MES oil was replaced by the polylimonene resin (8 phr), compared with the composition C-5.

The results of the test of resistance to chipping are listed in Table 6, in relative units, the base 100 having being used for the tires P-4 the tread of which comprises the conventional aromatic oil.

These results clearly confirm those of Test 1 above (Table 3), namely that the best resistance is obtained when a portion of the MES oil is replaced by the polylimonene resin (tires P-6), even if the magnitude of the effects appears slightly less pronounced than for the previous compositions reinforced with an inorganic filler.

TABLE 1

| | Composition No.: | | |
|---|---|---|---|
| | C-1 | C-2 | C-3 |
| S-SBR (1) | 70 | 70 | 70 |
| BR (2) | 30 | 30 | 30 |
| silica (3) | 81 | 81 | 81 |
| coupling agent (4) | 6.5 | 6.5 | 6.5 |
| carbon black (5) | 10 | 10 | 10 |
| aromatic oil (6) | 37 | — | — |
| MES oil (7) | — | 31.5 | 11.5 |
| polylimonene resin (8) | — | — | 20 |
| ZnO (9) | 1.5 | 1.5 | 1.5 |
| stearic acid (10) | 2 | 2 | 2 |
| antioxidant (11) | 1.9 | 1.9 | 1.9 |

TABLE 1-continued

| | Composition No.: | | |
|---|---|---|---|
| | C-1 | C-2 | C-3 |
| DPG (12) | 1.5 | 1.5 | 1.5 |
| sulfur | 1 | 1 | 1 |
| accelerator (13) | 2 | 2 | 2 |

(1) solution SBR extended with oil (amount expressed in dry SBR); 25% styrene, 58% 1,2-polybutadiene units and 23% trans-1,4-polybutadiene units (Tg = −24° C.);
(2) BR with 4.3% of 1-2; 2.7% of trans; 93% of cis 1,4 (Tg = −106° C.);
(3) silica "Zeosil 1165MP" from Rhodia, type "HD" - (BET and CTAB: approximately 160 m²/g);
(4) TESPT coupling agent ("Si69" from Degussa);
(5) carbon black N234 (grade ASTM);
(6) total aromatic oil (including extender oil for the SBR);
(7) total MES oil (including extender oil for the SBR);
(8) resin "Dercolyte L120" from DRT;
(9) zinc oxide (industrial grade - from Umicore);
(10) stearin ("Pristerene 4931" - from Uniqema);
(11) N-1,3-dimethylbutyl-N-phenylparaphenylenediamine (Santoflex 6-PPD from Flexsys);
(12) diphenylguanidine (Perkacit DPG from Flexsys);
(13) N-cyclohexyl-2-benzothiazyl sulfenamide (Santocure CBS - from Flexsys).

TABLE 2

| | Composition No. | | |
|---|---|---|---|
| | C-1 | C-2 | C-3 |
| Properties before curing: | | | |
| Mooney (MU) | 57 | 56 | 58 |
| T5 (min) | 12 | 12 | 12 |
| Properties after curing: | | | |
| Shore hardness | 67 | 68 | 67 |

TABLE 3

| | Tires No.: | | |
|---|---|---|---|
| | P-1 | P-2 | P-3 |
| Resistance to chipping | 100 | 85 | 115 |

(NB: a value greater than 100 indicates a performance which is improved compared with the base control 100)

TABLE 4

| | Composition No.: | | |
|---|---|---|---|
| | C-4 | C-5 | C-6 |
| E-SBR (1) | 80 | 80 | 80 |
| BR (2) | 20 | 20 | 20 |
| carbon black (3) | 66 | 66 | 66 |
| aromatic oil (4) | 29 | — | — |
| MES oil (5) | — | 25 | 17 |
| polylimonene resin (6) | — | — | 8 |
| ZnO (7) | 1.5 | 1.5 | 1.5 |
| stearic acid (8) | 2 | 2 | 2 |
| antioxidant (9) | 1.9 | 1.9 | 1.9 |
| sulfur | 1 | 1 | 1 |
| accelerator (10) | 2 | 2 | 2 |

(1) emulsion SBR extended with oil (expressed in dry SBR); 24% styrene, 15% 1,2-polybutadiene units and 78% trans-1,4-polybutadiene units (Tg = −48° C.);
(2) BR with 4.3% of 1-2; 2.7% of trans; 93% of cis 1,4 (Tg = −106° C.);
(3) carbon black N234 (grade ASTM);
(4) total aromatic oil (including extender oil for the SBR);
(5) total MES oil (including extender oil for the SBR);
(6) resin "Dercolyte L120" from DRT;
(7) zinc oxide (industrial grade - from Umicore);
(8) stearin ("Pristerene 4931" - from Uniqema);
(9) N-1,3-dimethylbutyl-N-phenylparaphenylenediamine (Santoflex 6-PPD from Flexsys);
(10) N-cyclohexyl-2-benzothiazyl sulfenamide (Santocure CBS from Flexsys).

TABLE 5

| | Composition No. | | |
|---|---|---|---|
| | C-4 | C-5 | C-6 |
| Properties before curing: | | | |
| Mooney (MU) | 87 | 86 | 90 |
| T5 (min) | 24 | 20 | 23 |
| Properties after curing: | | | |
| Shore hardness | 66 | 67 | 67 |

TABLE 6

| | Tires No.: | | |
|---|---|---|---|
| | P-4 | P-5 | P-6 |
| Resistance to chipping | 100 | 90 | 110 |

(NB: a value greater than 100 indicates a performance which is improved compared with the base control 100)

The invention claimed is:

1. A rubber composition based on a diene elastomer, a reinforcing filler, a plasticizing system and a cross-linking system, wherein said plasticizing system comprises (phr=parts by weight per hundred parts of elastomer):
   between 5 and 35 phr of an MES or TDAE oil; and
   between 5 and 35 phr of a polylimonene resin.

2. The composition according to claim 1, wherein the amount of polylimonene resin is between 5 and 25 phr.

3. The composition according to claim 2, wherein the amount of polylimonene resin between 5 and 20 phr.

4. The composition according to claim 1, the glass transition temperature (Tg) of the polylimonene resin is greater than 40° C.

5. The composition according to claim 4, wherein Tg is greater than 50° C.

6. The composition according to claim 1, wherein the number-average molecular weight (Mn) of the polylimonene resin is between 400 and 2000 g/mol.

7. The composition according to claim 6, wherein Mn is between 500 and 1000 g/mol.

8. The composition according to claim 1, wherein the amount of MES or TDAE oil is between 10 and 30 phr.

9. The composition according to claim 8, wherein the amount of MES or TDAE oil is between 10 and 25 phr.

10. The composition according to claim 1, wherein the amount of total plasticizing system is between 15 and 45 phr.

11. The composition according to claim 10, wherein the amount of total plasticizing system is between 20 and 40 phr.

12. The composition according to claim 1, wherein the plasticizing system furthermore comprises an unsaturated ($C_{12}$-$C_{22}$) fatty acid triester of glycerol.

13. The composition according to claim 1, wherein the plasticizing system furthermore comprises an unsaturated ($C_{12}$-$C_{22}$) fatty acid trister of glycerol which a glycerol trioleate.

14. The composition according to claim 13, wherein the glycerol trioleate is present in the form of a vegetable sunflower oil or rapeseed oil.

15. The composition according to claim 12 or 13, wherein the amount of triester is between 5 and 35 phr.

16. The composition according to claim 12 or 13, wherein the amount of total plasticizing system is between 20 and 70 phr.

17. The composition according to claim 16, wherein the amount of total plasticizing system is between 30 and 60 phr.

18. The composition according to claim 1, wherein the diene elastomer is selected from the group consisting of polybutadienes, natural rubber, synthetic polyisoprenes, butadiene copolymers, isoprene copolymers and mixtures of these elastomers.

19. The composition according to claim 1, wherein the amount of reinforcing filler is between 20 and 200 phr.

20. The composition according to claim 1, wherein the amount of reinforcing filler is between 30 phr and 150 phr.

21. The composition according to claim 19 or 20, wherein the reinforcing filler comprises majoritarily an inorganic filler in an amount of more than 50% by weight relative to the quantity of said reinforcing filler.

22. The composition according to claim 21, wherein the inorganic reinforcing filler is silica.

23. The composition according to claim 19 or 20, wherein the reinforcing filler comprises majoritarily an organic filler in an amount of more than 50% by weight relative to the quantity of said reinforcing filler.

24. The composition according to claim 23, wherein the reinforcing organic filler is carbon black.

25. A process for preparing a rubber composition having an improved resistance to abrasion and to cuts, this composition based on a diene elastomer, a reinforcing filler, a plasticizing system and a cross-linking system, said process comprising the following steps:
  incorporating in a diene elastomer, during a first step referred to as "non-productive", at least a reinforcing filler and a plasticizing system, by thermomechanically kneading the entire mixture, in one or more stages, until a maximum temperature of between 110° C. and 190° C. is reached;
  cooling the entire mixture to a temperature of less than 100° C.;
  then incorporating, during a second step referred to as "productive", the cross-linking system; and
  kneading the entire mixture until a maximum temperature of less than 110° C. is reached,
wherein said plasticizing system comprises:
  between 5 and 35 phr of an MES or TDAE oil; and
  between 5 and 35 phr of a polylimonene resin.

26. The process according to claim 25, wherein the amount of polylimonene resin is between 5 and 25 phr.

27. The process according to claim 26, wherein the amount of polylimonene resin is between 5 and 20 phr.

28. The process according to claim 25, wherein the glass transition temperature (Tg) of the polylimonene resin is greater than 40° C.

29. The process according to claim 25, wherein the number-average molecular weight (Mn) of the polylimonene resin is between 400 and 2000 g/mol.

30. The process according to claim 25, wherein, the amount of MES or TDAE oil is between 10 and 30 phr.

31. The process according to claim 25, wherein the amount of total plasticizing system is between 15 and 45 phr.

32. The process according to claim 25, wherein the plasticizing system furthermore comprises an unsaturated ($C_{12}$-$C_{22}$) fatty acid triester of glycerol.

33. The process according to claim 32, wherein the plasticizing system furthermore comprises unsaturated ($C_{12}$-$C_{22}$) fatty acid trister triester of glycerol which is a glycerol trioleate.

34. The process according to claim 33, wherein the glycerol trioleate is present in the form of a vegetable sunflower oil or rapeseed oil.

35. The process according to claim 32 or 33, wherein the amount of triester is between 5 and 35 phr.

36. The process according to claim 32, wherein the amount of total plasticizing system is between 20 and 70 phr.

37. The process according to claim 25, wherein the diene elastomer is selected from among the group consisting of polybutadienes, natural rubber, synthetic polyisoprenes, butadiene copolymers, isoprene copolymers and mixtures of these elastomers.

38. The process according to claim 25, wherein the amount of reinforcing filler is between 20 and 200 phr.

39. A finished article intended for a suspension system of a motor vehicle, comprising a composition according to claim 1.

40. The finished article according to claim 39, consisting of a tire.

41. A winter tire comprising a rubber composition according to claim 12.

42. A semi-finished product intended for a suspension system of a motor vehicle, comprising a composition according to claim 1.

43. The semi-finished product according to claim 42, consisting of a tire tread.

44. A winter tire having a tread comprising a rubber composition according to claim 12.

45. A plasticizing system usable for the plasticizing of a diene rubber composition, wherein said plasticizing system comprises an MES or TDAE oil and a polylimonene resin.

46. The plasticizing system according to claim 45, wherein said plasticizing system furthermore comprises an unsaturated ($C_{12}$-$C_{22}$) fatty acid triester of glycerol.

47. The plasticizing system according to claim 46, wherein the triester is a glycerol trioleate.

48. The plasticizing system according to claim 47, wherein the glycerol trioleate is present in the form of a vegetable sunflower oil or rapeseed oil.

49. A winter tire having a tread comprising a rubber composition according to claim 13.

50. A winter tire having a tread comprising a rubber composition according to claim 14.

51. A winter tire having a tread comprising a rubber composition according to claim 15.

52. A winter tire having a tread comprising a rubber composition according to claim 16.

53. A winter tire having a tread comprising a rubber composition according to claim 17.

* * * * *